United States Patent
Bourgeois

[15] 3,639,016
[45] Feb. 1, 1972

[54] ROLLING CONTACT BEARING SEALS
[72] Inventor: Claude Raymond Bourgeois, Annecy (Haute Savoie), France
[73] Assignee: Societe Nouvelle de Roulements, Annecy Haute Savoie, France
[22] Filed: Mar. 12, 1970
[21] Appl. No.: 19,020

[30] Foreign Application Priority Data
   Mar. 12, 1969  France.................................6907020
   Feb. 25, 1970  France.................................7006800

[52] U.S. Cl. ............................................308/187.2, 277/95
[51] Int. Cl. ........................................................F16j 15/32
[58] Field of Search ......................277/95, 81, 65; 308/187.2

[56] References Cited
       UNITED STATES PATENTS
3,266,269  8/1966  Stokely....................................277/95
3,479,840  11/1969  Meyers....................................277/95
2,990,201  6/1961  Stephens................................277/95 X
2,516,191  7/1950  Engelsson..............................277/95

Primary Examiner—Robert I. Smith
Attorney—Stevens, Davis, Miller & Mosher

[57] ABSTRACT

Seal for ball and roller bearings, of the type wherein the seal consisting of rubber or similar material is associated with one of the bearing races and comprises at least one lip coacting with an associated surface of the other race, such as a baffle plate, characterized in that the seal comprises an annular portion or bead force fitted to a surface associated with the race receiving same, thus providing between the lip or lips of said seal and the surface associated therewith a chamber adapted to be filled with a substance for improving the frictional contact while isolating said seal.

5 Claims, 12 Drawing Figures

3,639,016

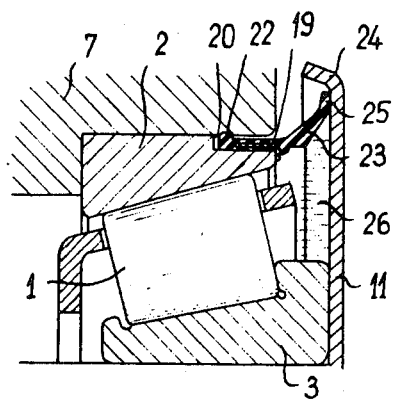
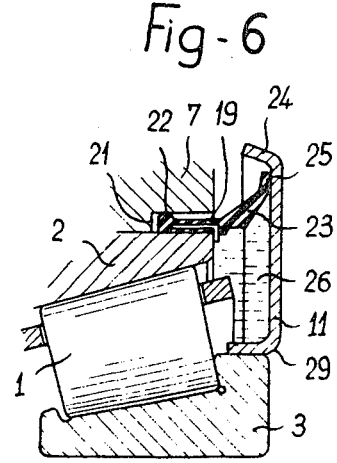
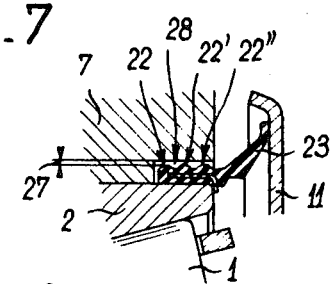
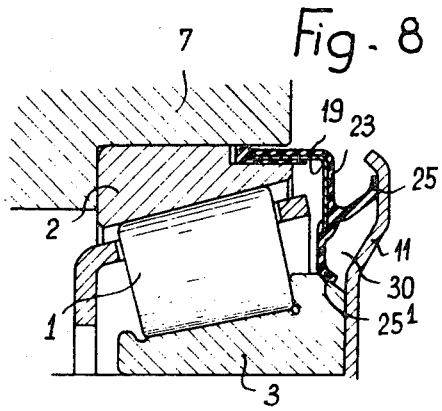
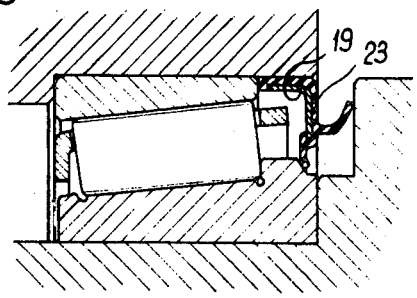
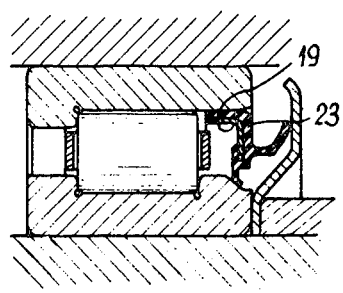
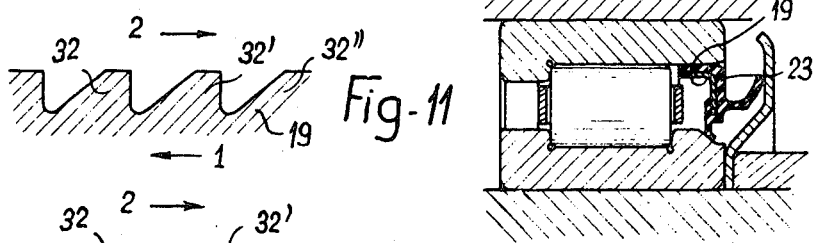

ROLLING CONTACT BEARING SEALS

This invention relates in general to seals of rolling-contact bearings such as ball or roller bearings, and is concerned more particularly with different forms of embodiment of seals of this character which comprise in combination a baffle element on one of the bearing races and a seal proper of rubber or other suitable material on the other race.

It is the essential object of this invention to provide various modifications in these combination seals designed more particularly but not exclusively for roller bearings.

Reference will now be made to the accompanying drawing of which FIGS. 1 to 10 illustrate in fragmentary radial section the application of this invention more particularly but not exclusively to roller bearings, and FIGS. 11 and 12 are enlarged sections showing details of the seal utilized with the roller bearings of FIGS. 9 and 10.

Figure 1:
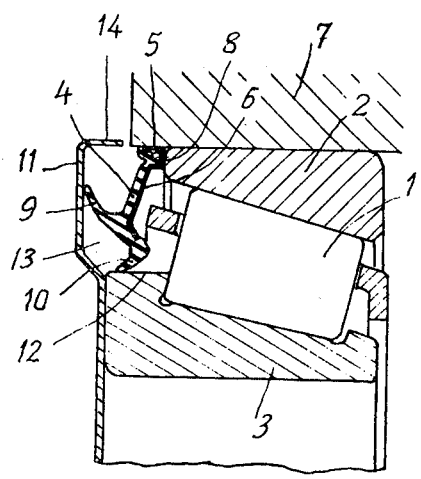

Referring now in detail to the drawing and more particularly to FIG. 1, showing a conventional taper roller bearing construction comprising taper rollers 1 and outer and inner races 2 and 3, the seal 4 according to this invention comprises an annular portion or bead 5 reinforced by an insert 6 and force-fitted in the bore of a bearing-receiving casing 7 so as to engage the front face 8 of race 2. The seal further comprises a front lip 9 and a radial inner lip 10, the former engaging a baffle plate 11 carried by inner race 3 and the latter the cylindrical surface 12 of inner race 3. The assembly comprising lips 9, 10 and baffle plate 11 forms a chamber 13 adapted to be filled with grease or any other lubricant capable of improving the frictional contact between said lips and the surfaces engaged thereby, while preventing the ingress of foreign matter into said chamber. The baffle plate 11 comprises an in-turned outer edge 14 for preventing larger foreign particles from damaging the seal 4. The pair of lips 9 and 10 combines a front sealing action with a radial sealing action separated by a substance also assisting in improving the sealing efficiency of the assembly.

Figure 2:
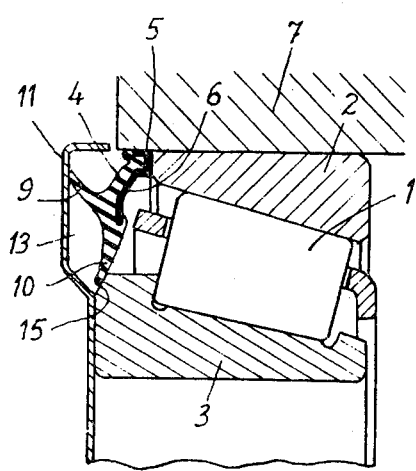

FIG. 2 shows a modified form of embodiment of the device of FIG. 1, wherein the lip 10 is in frictional contact with a bearing face 15 specially formed on the inner face 3, thus providing a sealing action intermediate between the radial and front sealing actions of the preceding example.

Figure 3:
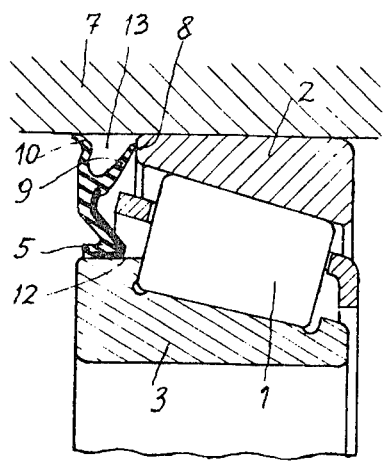

In the arrangement shown in FIG. 3 the bead 5 is force-fitted to the cylindrical surface 12 of inner race 3 and the lip 10 is in frictional engagement with the cylindrical surface of the bore of casing 7; on the other hand, the lip 9 is in frictional contact with the face 8 of race 2. Thus, a chamber 13 is formed for the same purpose as in the two preceding examples shown in FIGS. 1 and 2.

Figure 4:
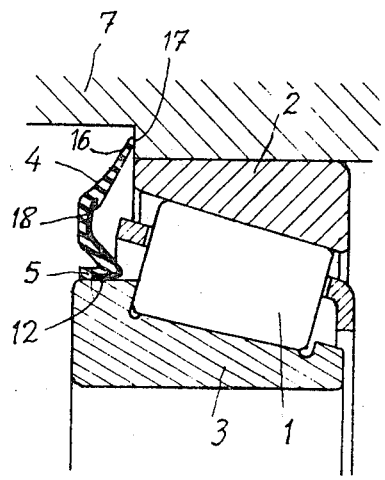

FIG. 4 illustrates a modification of the structure of FIG. 3, wherein the bead 5 is force-fitted to the inner race 3, the seal comprising a lip 16 resiliently engaging the face or a shoulder 17 of casing 7 with the assistance of a springlike resilient insert 18.

The arrangements of FIGS. 3 and 4 may be completed if desired by using a baffle plate or the like, as in the case of FIGS. 1 and 2.

In FIGS. 5 and 6, the tapered roller bearing 1 comprising outer and inner races 2 and 3 is protected by a seal 23 having an annular portion 19 force-fitted on a portion 20 of reduced diameter of outer race 2, in the case of FIG. 5, or directly on this race in the shoulder 21 of casing 7, in the case of FIG. 6.

The fluid-tightness between the annular portion 19 and the outer race of the bearing is obtained either by using a compressible or noncompressible material, or by a contact between the seal insert and said outer race. It may be noted that the annular portion 19 of the seal comprises a toroidal bead 22 providing the necessary tightness between the casing 7 and the outer portion of race 2. The front seal or lip 25 carried by the annular portion 19 bears against the baffle plate 11 or any other solid or thick portion of the device which is to be protected. The baffle plate 11 rigid either with the inner race 3 of the bearing or with the shaft (not shown), comprises an in-turned outer marginal portion 24 covering the lip 25 of the seal to protect the latter against the ingress of foreign particles into the space left between the casing 7 and the front seal 25. The chamber 26 is filled with a lubricant suitable for lubricating the bearing and the lip. The baffle plate 11 may be surface-treated to ensure an adequate coefficient of friction between said lip 25 and baffle plate 11.

Another arrangement illustrated in FIG. 7 may be obtained by providing on the annular portion 19 of the seal a plurality of successive toroidal beads or ribs 22, 22', 22''... constituting efficient baffle means between the casing 7 and the outer portion of the seal.

A clearance 27 of a suitable tightening between the toroidal beads and the bore diameter of casing 7 may be provided. The chambers 28 may be filled with grease or any other substance capable of sealing the joint between the seal and the casing. This arrangement may be particularly advantageous from the point of view of assembling (when a clearance is provided).

The baffle plate 11 may be force-fitted to the outer diameter of the inner race by means of a cylindrical centering collar portion 29, as shown in FIG. 6.

The seal may also comprise two lips 25, 25¹ in order to isolate a chamber or cavity 30 (FIG. 8) to be filled with lubricant.

FIGS. 9 and 10 illustrate a specific form of embodiment of a beaded or ribbed seal associated with a tapered roller bearing (FIG. 9) and a cylindrical roller bearing (FIG. 10).

The feature characterizing this seal is the configuration of the annular portion or bead 19 shown more in detail in FIGS. 11 and 12.

According to this form of embodiment of the invention, the bead comprises as seen in radial section a series of annular teeth 32, 32', 32''... having a profile similar to that of Buttress threads, whereby when stressed in the fitting direction (1) the ribs are deflected to assume the form shown in FIG. 12, an effort in the opposite direction (2) causing these ribs to take a firm grip against the bore surface, thus providing a safety feature protecting the seal against any tendency of being ejected during actual service.

Although a few exemplary forms of embodiment of this invention have been shown and described herein, it would not constitute a departure from the basic principles thereof to bring various modifications and variations in the practical actuation thereof outside the ones proposed herein, as will readily occur to anybody conversant with the art. Therefore, any such adaptations should and are intended to be comprehended within the meaning and range of equivalence of the following claims.

What is claimed as new is:

1. A resilient bearing seal for a bearing having a casing, first and second bearing races disposed in said casing and a baffle plate connected to one of said bearing races, said baffle plate having an in-turned protective marginal portion, said seal comprising: (a) an annular portion in fitted engagement with the outer surface of said first bearing race, said annular portion having a toroidal bead in sealing engagement between said outer surface of said first race and said casing; (b) a first lip portion bearing against said baffle plate; (c) and a cavity defined by said baffle plate, said lip portion and at least one of said bearing races, said cavity having a lubricant contained therein.

2. A resilient seal as defined in claim 1, wherein said annular portion comprises a series of successive baffle-forming beads disposed between said casing and said first bearing race, said series of beads having gaps defined therebetween containing a lubricant for sealing the joint between said casing and said first race.

3. Seal according to claim 2, characterized in that said beads have a toroidal contour.

4. Seal according to claim 2, characterized in that said beads have a tooth-shaped profile corresponding preferably to that of Buttress threads.

5. A resilient seal as defined in claim 1, further comprising a second lip portion in fitted engagement with said second bearing race, wherein said cavity is defined by said first and second lip portions, said second bearing race and said baffle plate.